US012611715B2

(12) United States Patent
Vogtmeier et al.

(10) Patent No.: US 12,611,715 B2
(45) Date of Patent: Apr. 28, 2026

(54) POST-PROCESSING OF AN OBJECT OBTAINED BY DIRECT METAL LASER SINTERING

(71) Applicant: KONINKLIJKE PHILIPS N.V., Eindhoven (NL)

(72) Inventors: Gereon Vogtmeier, Aachen (DE); Christiaan Kok, Noord-Brabant (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 560 days.

(21) Appl. No.: 18/023,871

(22) PCT Filed: Aug. 25, 2021

(86) PCT No.: PCT/EP2021/073447
§ 371 (c)(1),
(2) Date: Feb. 28, 2023

(87) PCT Pub. No.: WO2022/048957
PCT Pub. Date: Mar. 10, 2022

(65) Prior Publication Data
US 2023/0321727 A1      Oct. 12, 2023

(30) Foreign Application Priority Data

Sep. 1, 2020    (EP) .................................... 20193859

(51) Int. Cl.
*B22F 10/28* (2021.01)
*B22F 10/68* (2021.01)
(Continued)

(52) U.S. Cl.
CPC .............. *B22F 10/28* (2021.01); *B22F 10/68* (2021.01); *B33Y 10/00* (2014.12); *B33Y 50/00* (2014.12); *B33Y 80/00* (2014.12); *B22F 2203/00* (2013.01)

(58) Field of Classification Search
CPC ...... B22F 10/28; B22F 10/68; B22F 2203/00; B22F 3/003; B22F 3/16; B22F 5/10;
(Continued)

(56) References Cited

U.S. PATENT DOCUMENTS 10,393,683 B2      8/2019   Hegeman
2010/0061520 A1*    3/2010   Dorscheid ................. B22F 7/08
                                                         378/154
(Continued)

FOREIGN PATENT DOCUMENTS

FR          2970663 A1 *   7/2012   .............. B22F 10/28
FR          2970663 B1    12/2013
(Continued)

OTHER PUBLICATIONS

FR-2970663-A1: Espacenet English machine translation (Year: 2012).*
(Continued)

*Primary Examiner* — Adil A. Siddiqui
(74) *Attorney, Agent, or Firm* — Larry Liberchuk

(57) ABSTRACT

The present invention relates to a method and a system for treating a surface of an object obtained by direct metal laser sintering. The object is sintered from a metal powder with a grain size distribution. Due to the manufacturing process, the object can comprise a rough surface with remaining grains of the metal powder attached to the surface. The method according to the present invention provides parameters for post-processing the object to achieve a smooth surface suitable for use in medical imaging systems.

10 Claims, 2 Drawing Sheets

(51) Int. Cl.
B33Y 10/00 (2015.01)
B33Y 50/00 (2015.01)
B33Y 80/00 (2015.01)

(58) Field of Classification Search
CPC ............... B22F 10/20; B22F 2003/244; B22F
2003/245; B22F 10/60; B22F 10/62;
B22F 10/64; B22F 10/66; B22F 10/00;
B33Y 10/00; B33Y 50/00; B33Y 80/00;
B33Y 30/00; B33Y 40/20; B33Y 50/02;
B29C 64/188; B29C 64/379; C25F 3/26;
C25F 7/00; B24C 1/08; G21K 1/025;
Y02P 10/25; B23K 26/3576
See application file for complete search history.

(56) References Cited

U.S. PATENT DOCUMENTS

| | | |
|---|---|---|
| 2011/0122999 A1 | 5/2011 | Vogtmeier |
| 2015/0144496 A1 | 5/2015 | Morris |
| 2017/0368757 A1 | 12/2017 | Herzog |
| 2018/0257141 A1 | 9/2018 | Hofmann |

FOREIGN PATENT DOCUMENTS

| | | | | |
|---|---|---|---|---|
| FR | 3042510 A1 * | 4/2017 | ............... | C25F 3/16 |
| FR | 30425410 A1 | 4/2017 | | |
| WO | WO2019068117 A1 | 4/2019 | | |
| WO | WO2020070518 A1 | 4/2020 | | |

OTHER PUBLICATIONS

FR-3042510-A1: Espacenet English machine translation (Year: 2017).*
PCT International Search Report, International application No. PCT/EP2021/073447, Dec. 14, 2021.
Nagarajan B. et al., "Development of Micro Selective Laser Melting: The State of the Art and Future Perspectives", Engineering, vol. 5, No. 4, Jul. 3, 2019 (Jul. 3, 2019), pp. 702-720, XP055711107.
Kumbhar N.N. et al., "Post Processing Methods Used to Improve Surface Finish of Products which are Manufactured by Additive Manufacturing Technologies: A Review", Journal of the Institution of Engineers India Series C, vol. 99, No. 4, pp. 481-487, 2016.

* cited by examiner

POST-PROCESSING OF AN OBJECT OBTAINED BY DIRECT METAL LASER SINTERING

FIELD OF THE INVENTION

The present invention relates to a method of treating a surface of an object obtained by direct metal laser sintering, an X-ray anti-scatter grid obtained by direct metal laser sintering, and a system for treating a surface of an object obtained by direct metal laser sintering.

BACKGROUND OF THE INVENTION

The technology of three-dimensional printing of objects and especially the technology of direct metal laser sintering (DMLS) of objects from Tungsten or Molybdenum metal powder enables the design of customized anti-scatter grids e.g. for computed tomography applications. The design of two-dimensional focused lamellae with thin wall structure allows for high-performance scatter suppression and precise focusing in direction of the x-ray focal spot position. The performance and properties of such an anti-scatter grid that is built with DMLS technology depends heavily on the powder quality like grain size distribution, the laser focus, the laser intensity and the building strategy like the laser beam track. For direct metal laser sintering, a relative coarse powder has to be used with grainsizes in the order of about 20 microns to be able to have the right flowability to deposit thin but homogeneous powder layers. Using finer powder would also be detrimental to the productivity since the build volume per hour goes down considerably with decreasing grain size. Therefore, the wall thickness and surface roughness of the lamellae as may be defined by ASTM B946 in many cases may be not good enough for optimized image quality performance. Single grains at the surface may influence the X-ray beam and result in scattered radiation and/or inhomogeneous intensity absorption, which in addition also increases the alignment requirements for not having dynamic beam attenuation effects in the beam path. The post-processing of the 3D printed objects is an essential step to increase image quality performance and at the same time pushes the additive manufacturing process to the next quality level, which is required for product to be used, for example, in medical imaging systems.

The inventors of the present invention have thus found that it would be advantageous to have a method and a system for treating a surface of an object obtained by direct metal laser sintering that provides a high-quality surface of the object that is suitable for use in a medical imaging apparatus.

SUMMARY OF THE INVENTION

It is an object of the present invention to provide a method and a system for treating a surface of an object obtained by direct metal laser sintering that provides an object with a low surface roughness that is suitable for use in a medical imaging apparatus.

The object of the present invention is solved by the subject matter of the independent claims, wherein further embodiments are incorporated in the dependent claims.

The described embodiments similarly pertain to the method of treating a surface of an object obtained by direct metal laser sintering, the X-ray anti-scatter grid obtained by direct metal laser sintering, and the system for treating a surface of an object obtained by direct metal laser sintering.

Synergistic effects may arise from different combinations of the embodiments although they might not be described in detail.

Further on, it shall be noted that all embodiments of the present invention concerning a method, might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

According to a first aspect of the invention, there is provided a method of treating a surface of an object obtained by direct metal laser sintering. The method comprises the steps of providing the object obtained by direct metal laser sintering, the object having a maximum grain size and an initial surface roughness range, and post-processing the surface of the object with a surface optimization technology, the surface optimization technology reducing a surface roughness of the surface of the object. The method comprises further the steps of measuring a post-processing surface roughness range of the surface, and determining whether a condition of the post-processing surface roughness range is met, wherein the condition at least requires the post-processing surface roughness range being smaller than the initial surface roughness range by a factor of at least two, and the post-processing surface roughness range being smaller than the maximum grain size. The method comprises further stopping the method of treating the surface of the object in case the condition is met, and repeating the method of treating the surface of the object starting with the step of post-processing the surface of the object in case the condition is not met.

In other words, the surface of an object obtained by direct metal laser sintering is treated. Direct metal laser sintering is a method of 3D printing, wherein a metal powder with a grain size range from $g_{min}$ to $g_{max}$ is applied in a thin layer, and each layer is molten by a laser beam to connect to the preceding layer beneath. Thus, the single metal grains combine to a solid metal object of predetermined shape. This object obtained by direct metal laser sintering can be provided in a first step of the method according to the invention. However, alternatively, the method can also comprise a step of obtaining the object by a process of direct metal laser sintering. The object has an initial surface roughness that can be defined by a range in elevation of points of the surface of the object with respect to an average plane of the surface. The difference of a maximum elevation to a minimum elevation results in a parameter corresponding to the roughness of the surface that has the unit of a length. This initial surface roughness range can be effected by excess metal grains that are only partially molten and/or that are attached only superficially to the surface. These grains can have a detrimental effect on the surface quality and therefore the image quality in case the object is provided to a medical imaging system like a computed tomography scanner. Post-processing the surface of the object with a surface optimization technology can reduce the surface roughness of the object such that at least most of the excess grains attached to the surface are removed. In a next step, the post-processing surface roughness range of the surface is measured, and it is determined whether the post-processing surface roughness range fulfills a condition. This condition to be fulfilled at least requires that the post-processing surface roughness range is smaller than the initial surface roughness range by a factor of at least two. Thus, the post-processing surface roughness has only half the size of the initial surface roughness, and the surface quality is increased. Further, the condition requires that the post-processing surface roughness range is smaller than the maximum grain size $g_{max}$ of the metal powder of the direct metal laser sintering process. The grain size may be defined by an average diameter of the grain. This condition should be fulfilled on at least 85 percent of the overall surface area of the object, preferably on more than 95 percent of the surface area. If the condition is fulfilled, the object comprises a high-quality surface suitable for the expected purpose and the treatment of the surface of the object can be stopped. In case the condition is not fulfilled, the method of treating the surface of the object can be repeated starting with the step of post-processing the surface of the object. Thus, the surface roughness of the object can be decreased even more and the required surface quality can be obtained. Therefore, according to the invention, a process parameter set is described to achieve a better surface quality with post-processing technologies. This surface quality can be detected via scanning electron microscopy or other suitable technologies. The surface structure can be by far better compared to what is possible by directly using additive manufacturing processes as direct metal laser sintering and/or selective laser sintering and/or other 3D printing technologies for, for example, high X-ray absorbing materials. However, the object can also be obtained by other manufacturing processes.

In an embodiment of the invention, the condition further requires the post-processing surface roughness range being smaller than the maximum grain size by a factor of at least two.

Reducing the surface roughness even further is achieved in this embodiment of the invention. The post-processing surface roughness is compared with the maximum grain size of the metal powder of the direct metal laser sintering process, and the condition is fulfilled in case the post-processing surface roughness range is smaller than half of the grain size. This condition should be fulfilled on at least 85 percent of the surface area of the object, preferably on more than 95 percent of the surface area. The inventors found out that this criterion results in a reliable condition to determine whether the surface quality is high enough to be used in a medical imaging system without too much X-ray scattering.

In an embodiment of the invention, a surface roughness range is defined by a difference in elevation of a highest point of the surface of the object and a lowest point of the surface of the object.

This surface roughness can be determined on the complete surface of the object. However, the determination of the surface roughness can also be applied to a representative part of the surface. However, also different definitions of the surface roughness can be used, as long as they result in a value with a length unit that is comparable to the grain size.

In an embodiment of the invention, the surface optimization technology is selected from the list comprising sand blasting, electro polishing, laser polishing, chemical etching, thermal treatment, high-pressure treatment, and high-pressure treatment using a gas- and/or liquid substance comprising an additional abrasive material.

The removal of loose grains and also the minimization of uneven topology effects of the surface of the object can be achieved by several methods out of the list of sand blasting, electro and/or laser polishing, chemical etching, thermal treatments and high pressure treatment using gas- and/or liquid substances that could be filled also with additional abrasive materials. However, also different processes for reducing the surface roughness may be applied.

In an embodiment of the invention, post-processing the surface of the object with the surface optimization technology comprises removing grains attached to the surface of the object.

The powder for the direct metal laser sintering process typically can have a grain size distribution where the largest grain size determines the minimum feature size of the object to be build. A grain size of 30 to 40 $\mu$m would allow for walls in the range of 80 to 120 $\mu$m, as typically the finest stable structure is in the dimension of 2 to 3 times the grain size. Smaller grains will fill the gaps and densify during the re-melting process. The roughness of the object as the built structure then typically is in the range of half the grain size, which is approximately 10 to 20 $\mu$m, which could be too large for many desired applications. As consequence, the post-processing step has to bring down the roughness to values below 20 $\mu$m—preferable below 10 $\mu$m and smaller. This removal of the outstanding grain particles would also clearly be visible in an analysis under the microscope. All of the post-processing methods lead to smaller surface roughness structures, which would be smaller than 10 $\mu$m for the overall surface. In general, the reduction to a maximum surface roughness, which is e.g. smaller than half of the grain size of the mean grain size distribution, can qualify for the desired application. The specific scanning electron microscopy topology of the structure after the post-processing step shows the successful application of the method according to the invention when 95 percent of the grains are removed.

In an embodiment of the invention, the object obtained by direct metal laser sintering is made of tungsten or molybdenum.

These metals offer a good X-ray absorption probability and are commonly used as absorber for X-ray radiation in computed tomography systems.

In an embodiment of the invention, the object is an X-ray anti-scatter grid.

The method according to this embodiment of the invention can be used for treating the surface of anti-scatter grids—especially for computed tomography scanners—that are manufactured with DMLS technologies. An improved quality of the surface structure inside the focusing channels of the 2D anti-scatter grid can be achieved. However, the method can also be applied to the production of non-medical products where the surface quality of the typical surface roughness of the laser sintered components needs to be improved.

In an embodiment of the invention, the X-ray anti-scatter grid comprises an array of channels, and wherein the initial surface roughness range and/or the post-processing surface roughness range are measured on an interior surface of a channel.

The X-ray anti-scatter grid can comprise an array of small channels, and the surface roughness that needs to be improved is measured in the inside of the channels. This is where the scattering of X-ray radiation can have the most detrimental effect. For the quality of a computed tomography measurement, the dynamic shadowing is an important parameter. Variations in the intensity of the X-ray radiation transmitted through a channel and caused by not defined effects like grains attached to the surface might cause artefacts in the reconstructed image. Thus, scattering or absorption of the X-ray radiation caused by grains attached to the surface of the channel has to be avoided. These shadowing effects of the grains are undefined and may be dependent on the beam direction and the object to be scanned.

In an embodiment of the invention, the initial surface roughness range and/or the post-processing surface roughness range is determined by scanning electron microscopy.

Via scanning electron microscopy images, the roughness of the surface can be measured, and by comparison of the roughness before and after the step of post-processing a smoothening can be detected. The scanning electron microscopy can allow a view in the inside of at least a part of a channel and can provide a measure of the roughness of the surface and the number of the grains that are attached to the surface of the object.

In an embodiment of the invention, the maximum grain size is about 40 μm, and the post-processed surface roughness range is smaller than 20 μm.

The metal powder can have a grain size distribution with a maximum grain size in the order of 40 μm. Thus, after post-processing, a roughness range smaller than 20 μm can be desired.

According to another aspect of the invention, there is provided an X-ray anti-scatter grid obtained by direct metal laser sintering and treated by the method according to any of the preceding embodiments.

The X-ray anti-scatter grid of this aspect of the invention can be applied to/used in combination with a computed tomography apparatus for absorbing scattered X-rays and providing a parallel and homogenous beam. Alternatively, a controlled focused or defocused beam can be provided. The anti-scatter grid is treated by the method according to the invention in order to comprise a smooth surface with a high surface quality necessary for use in medical imaging systems.

In a preferred embodiment, the X-ray anti-scatter grid is made from Tungsten or Molybdenum metal powder. The X-ray anti-scatter grid may comprise two-dimensional focused lamellae with thin wall structure allowing for high-performance scatter suppression and precise focusing in direction of the X-ray focal spot position.

In an embodiment of the invention, a surface roughness range of a surface of the X-ray anti-scatter grid is smaller than a maximum grain size of a direct metal laser sintering process by a factor of at least two.

The surface roughness of the anti-scatter grid that needs to be achieved is smaller than half of the grain size. This criterion is preferably fulfilled on at least 85 percent of the surface of the inside of the channels of the grid, even more preferably on 95 percent of the surface.

According to another aspect of the invention, there is provided a system for treating a surface of an object obtained by direct metal laser sintering. The system comprises a surface optimization unit configured for reducing a surface roughness of the surface of the object, and a measurement unit configured for measuring a post-processing surface roughness range of the surface of the object. The system further comprises a determination unit configured for determining whether a condition of the post-processing surface roughness range is met, wherein the condition comprises the post-processing surface roughness range being smaller than an initial surface roughness range by a factor of at least two, and the post-processing surface roughness range being smaller than a maximum grain size of the direct metal laser sintering.

The system is configured for treating the surface of the object according to the method for treating the surface of the object. Optionally, the system can comprise a unit for obtaining the object by direct metal laser sintering. The system comprises a surface optimization unit for applying a surface optimization technology to the surface of the object thus reducing the surface roughness. A measurement unit can determine the surface roughness of the surface of the object before and after post-processing the surface. A determination unit determines whether a condition of the post-processing surface roughness is fulfilled. The condition comprises the criterion that the post-processing surface roughness range is smaller than the initial surface roughness range by a factor of at least two, and the criterion that the post-processing surface roughness range is smaller than the maximum grain size of the direct metal laser sintering process. The determination unit can comprise a processing unit, which is configured for controlling the surface optimization unit and the measurement unit.

In an embodiment, the system for treating a surface of an object obtained by direct metal laser sintering also carries out the direct metal laser sintering with which the object, preferably the X-ray anti-scatter grid, is produced/provided.

According to another aspect of the invention, there is provided a computer program element, which, when executed on a processing unit, instructs the processing unit to cause the method with the steps of post-processing a surface of an object with a surface optimization technology, the surface optimization technology reducing a surface roughness of the surface of the object and wherein the object was obtained by direct metal laser sintering, the object having a maximum grain size and an initial surface roughness range. The method comprises further the steps of measuring a post-processing surface roughness range of the surface, and determining whether a condition of the post-processing surface roughness range is met, wherein the condition at least requires the post-processing surface roughness range being smaller than the initial surface roughness range by a factor of at least two, and the post-processing surface roughness range being smaller than the maximum grain size. The method comprises further the step of stopping the method of treating the surface of the object in case the condition is met, and repeating the method of treating the surface of the object starting with the step of post-processing the surface of the object in case the condition is not met.

The computer program element can be performed on one or more processing units, which are instructed to cause the method of treating a surface of an object obtained by direct metal laser sintering. The method step of post-processing the surface of the object can be performed by a surface optimization unit configured for reducing the surface roughness, which is instructed by the processing unit when executing the computer program element. The step of measuring the surface roughness can be performed by a measurement unit configured for measuring the post-processing surface roughness, and the step of determining whether a condition of the post-processing surface roughness is met can be performed by a determination unit are instructed by the processing unit.

Preferably, the program element is stored in a system for treating a surface of an object obtained by direct metal laser sintering and a processing unit carrying out this program element is part of said system. In a preferred embodiment, said system also performs the direct metal laser sintering.

The computer program element may be part of a computer program, but it can also be an entire program by itself. For example, the computer program element may be used to update an already existing computer program to get to the present invention.

The computer program element may be stored on a computer readable medium. The computer readable medium may be seen as a storage medium, such as for example, a USB stick, a CD, a DVD, a data storage device, a hard disk, or any other medium on which a program element as described above can be stored.

According to another aspect of the invention, there is provided a processing unit configured for executing the computer program element according to the preceding embodiment.

The processing unit can be distributed over one or more different devices executing the computer program element according to the invention.

Thus, the benefits provided by any of the above aspects equally apply to all of the other aspects and vice versa.

In a gist, the invention relates to a method and a system for treating a surface of an object obtained by direct metal laser sintering. The object is sintered from a metal powder with a grain size distribution. Due to the manufacturing process, the object can comprise a rough surface with remaining grains of the metal powder attached to the surface. The method according to the present invention provides parameters for post-processing the object to achieve a smooth surface suitable for use in medical imaging systems.

The above aspects and embodiments will become apparent from and be elucidated with reference to the exemplary embodiments described hereinafter. Exemplary embodiments of the invention will be described in the following with reference to the following drawings:

DETAILED DESCRIPTION OF EMBODIMENTS

Figure 1:
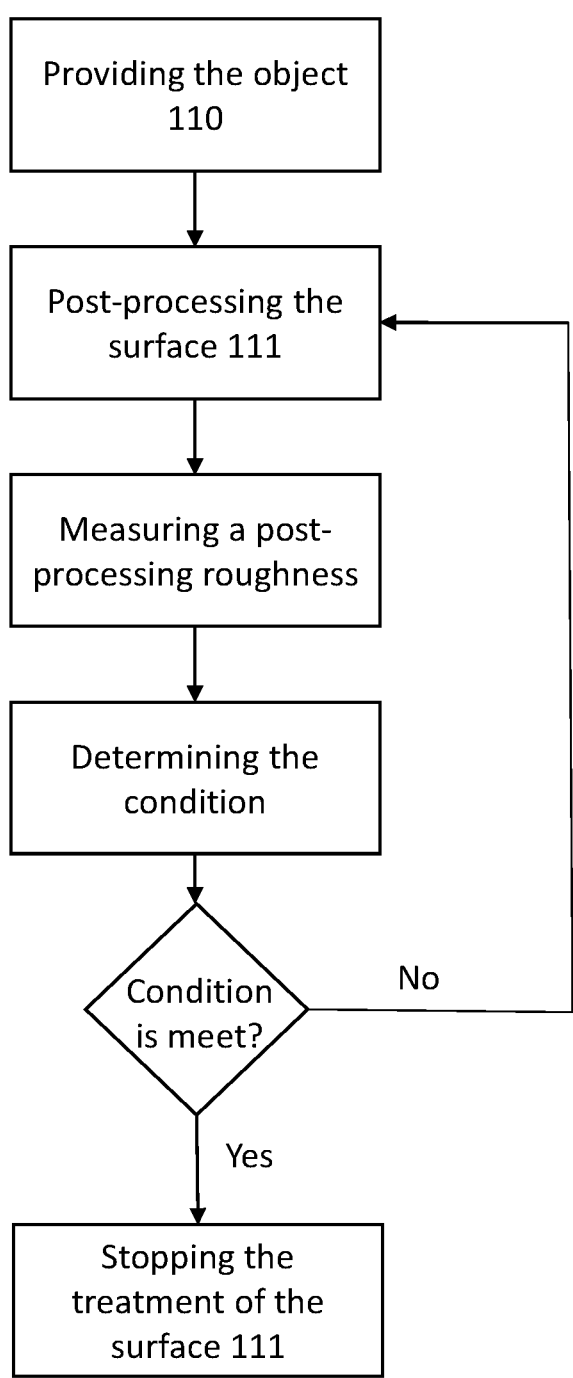
FIG. 1 shows a block diagram of the method of treating a surface of an object obtained by direct metal laser sintering.

FIG. 1 shows a block diagram of the method of treating a surface 111 of an object 110 obtained by direct metal laser sintering. In a first step, the object 110 obtained by direct metal laser sintering is provided. The object 110 has a maximum grain size and an initial surface roughness range. The object 110 can also by produced by direct metal laser sintering as part of the first step of the method. In a second step, the surface 111 of the object 110 is post-processed with a surface optimization technology, which reduces a surface roughness of the surface 111 of the object 110. In a third step, the post-processing surface roughness range of the surface 111 of the object 110 is measured. In a fourth step, it is determined whether a condition of the post-processing surface roughness range is met. The condition at least requires that the post-processing surface roughness range is smaller than the initial surface roughness range by a factor of at least two, and that the post-processing surface roughness range is smaller than the maximum grain size. If the condition is met after the step of post-processing, the method of treating the surface 111 of the object 110 is stopped in a fifth step. In case the condition is not met, the method of treating the surface 111 of the object 110 is repeated, and the surface 111 of the object 110 is again post-processed in the second step. Alternatively, the condition might require that the post-processing surface roughness range of the surface 111 of the object 110 is smaller than half of the maximum grain size.

In an exemplary embodiment, the powder grain size of the direct metal laser sintering process can be in the range [a-b], the processed or initial surface roughness can be in the range [c-d], and the post-processed surface roughness after post-processing can be in the range [e-f]. Thus, a condition to be met can be written as [e-f]~½ [c-d], and [c-d] smaller than b, preferably smaller than 50% of b, with b being the maximum grain size.

Figure 2:
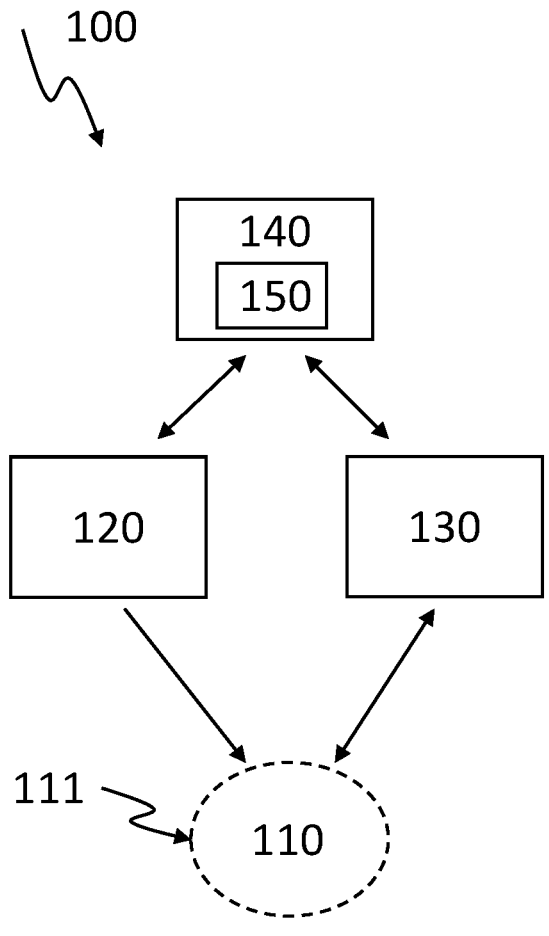
FIG. 2 shows a schematic set-up of a system for treating a surface of an object obtained by direct metal laser sintering.

FIG. 2 shows a schematic set-up of a system 100 for treating a surface 111 of an object 110 obtained by direct metal laser sintering. The object 110 is provided by a direct metal laser sintering system. However, this direct metal laser sintering system can be part of the system 100. The object 110 comprises a surface 111 with a surface roughness range. A surface optimization unit 120 is configured for post-processing the surface 111 of the object 110, thus reducing the surface roughness. The surface roughness range is measured by a measurement unit 130 that is configured for measuring an initial surface roughness range before post-processing and a post-processing surface roughness range after post-processing. These parameters are compared by a determination unit 140 that is configured for determining whether a condition is met. The condition at least requires that the post-processing surface roughness range is smaller than the initial surface roughness range by a factor of at least two, and that the post-processing surface roughness range is smaller than the maximum grain size, preferably smaller than half of the maximum grain size. The determination unit 140 may comprise a processing unit 150 that is configured for performing the determination and that can control the surface optimization unit 120 and the measurement unit 130.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. The mere fact that certain measures are re-cited in mutually different dependent claims does not indicate that a combination of these measures cannot be used to advantage. Any reference signs in the claims should not be construed as limiting the scope.

LIST OF REFERENCE SIGNS 100 system
110 object
111 surface
120 surface optimization unit
130 measurement unit
140 determination unit
150 processing unit

The invention claimed is:

1. A method of treating a surface of an object, the method comprising:

providing the object obtained by direct metal laser sintering from a metal powder, the object having a maximum grain size of the metal powder and an initial surface roughness range;

post-processing the surface of the object with a surface optimization technology, the surface optimization technology reducing a surface roughness of the surface of the object;

measuring a post-processing surface roughness range of the surface;

determining whether a condition of the post-processing surface roughness range is met, wherein the condition at least requires the post-processing surface roughness range being smaller than the initial surface roughness range by a factor of at least two, and the post-processing surface roughness range being smaller than the maximum grain size; and stopping treating the surface of the object when the condition is met, and repeating treating the surface of the object starting with post-processing the surface of the object when the condition is not met;

wherein post-processing the surface of the object with the surface optimization technology comprises removing grains attached to the surface of the object, and wherein a surface roughness range is defined by a difference in elevation of a highest point of the surface of the object and a lowest point of the surface of the object.

2. The method according to claim 1, wherein the condition further requires the post-processing surface roughness range being smaller than the maximum grain size by a factor of at least two.

3. The method according to claim 1, wherein the surface optimization technology is at least one of: sand blasting, electro polishing, laser polishing, chemical etching, thermal treatment, high-pressure treatment, and high-pressure treatment using a gas and/or liquid substance comprising an additional abrasive material.

4. The method according to claim 1, wherein the object obtained by direct metal laser sintering is made of tungsten or molybdenum.

5. The method according to claim 1, wherein the object is an X-ray anti-scatter grid.

6. The method according to claim 5, wherein the X-ray anti-scatter grid comprises an array of channels, and wherein the initial surface roughness range and/or the post-processing surface roughness range are measured on an interior surface of a channel.

7. The method according to claim 1, wherein the initial surface roughness range and/or the post-processing surface roughness range is determined by scanning electron microscopy.

8. The method according to claim 1, wherein the maximum grain size is about 40 $\mu m$, and the post-processed surface roughness range is smaller than about 20 $\mu m$.

9. A system for treating a surface of an object obtained by direct metal laser sintering from a metal powder, the system comprising:

a surface optimization unit configured for reducing a surface roughness of the surface of the object;

a measurement unit configured for measuring a post-processing surface roughness range of the surface of the object; and a determination unit configured for determining whether a condition of the post-processing surface roughness range is met, wherein the condition comprises the post-processing surface roughness range being smaller than an initial surface roughness range by a factor of at least two, and the post-processing surface roughness range being smaller than a maximum grain size of the metal powder of the direct metal laser sintering, wherein post-processing the surface of the object with the surface optimization technology comprises removing grains attached to the surface of the object, and wherein a surface roughness range is defined by a difference in elevation of a highest point of the surface of the object and a lowest point of the surface of the object.

10. A non-transitory computer-readable medium for storing executable instructions, which cause a method to be performed for treating a surface of an object, the method comprising:

post-processing the surface of the object with a surface optimization technology, the surface optimization technology reducing a surface roughness of the surface of the object, wherein the object is obtained by direct metal laser sintering from a metal powder, the object having a maximum grain size of the metal powder and an initial surface roughness range;

measuring a post-processing surface roughness range of the surface;

determining whether a condition of the post-processing surface roughness range is met, wherein the condition at least requires the post-processing surface roughness range being smaller than the initial surface roughness range by a factor of at least two, and the post-processing surface roughness range being smaller than the maximum grain size; and stopping the method of treating the surface of the object when the condition is met, and repeating treating the surface of the object starting with post-processing the surface of the object when the condition is not met, wherein post-processing the surface of the object with the surface optimization technology comprises removing grains attached to the surface of the object, and wherein a surface roughness range is defined by a difference in elevation of a highest point of the surface of the object and a lowest point of the surface of the object.

*     *     *     *     *